(12) United States Patent
Shirasaki et al.

(10) Patent No.: US 8,250,994 B2
(45) Date of Patent: Aug. 28, 2012

(54) COLLAPSIBLE MATERIAL, PLACEMENT RACK, INCINERATION METHOD, LOST-WAX MOLD, AND MOLD COLLAPSING METHOD

(75) Inventors: Kazuo Shirasaki, Kumagaya (JP); Yozaburo Osawa, Kumagaya (JP)

(73) Assignees: Kazo Shirasaki, Saitama (JP); Norihito Shirasaki, Gunma (JP)

(*) Notice: Subject to any disclaimer, the term of this patent is extended or adjusted under 35 U.S.C. 154(b) by 60 days.

(21) Appl. No.: 12/302,377

(22) PCT Filed: Jun. 16, 2008

(86) PCT No.: PCT/JP2008/060941
§ 371 (c)(1),
(2), (4) Date: Nov. 25, 2008

(87) PCT Pub. No.: WO2009/087785
PCT Pub. Date: Jul. 16, 2009

(65) Prior Publication Data
US 2010/0229769 A1   Sep. 16, 2010

(30) Foreign Application Priority Data
Jan. 9, 2008   (JP) ................... 2008-002391

(51) Int. Cl.
*F23G 1/00*   (2006.01)
*F23B 90/00*   (2011.01)
*C04B 20/06*   (2006.01)
(52) U.S. Cl. ......... 110/194; 110/341; 106/716; 106/675
(58) Field of Classification Search .......... 110/194, 110/341; 106/716, 675, 772
See application file for complete search history.

(56) References Cited

U.S. PATENT DOCUMENTS
2,968,848 A * 1/1961 Carter ................ 164/128
(Continued)

FOREIGN PATENT DOCUMENTS
GB   1 509 298 A   5/1978
(Continued)

OTHER PUBLICATIONS
European Search Report for counterpart application No. EP08777229; Sep. 28, 2011.

*Primary Examiner* — Kenneth Rinehart
*Assistant Examiner* — David J Laux
(74) *Attorney, Agent, or Firm* — Pearne & Gordon LLP (57) ABSTRACT

A collapsible material is provided which maintains a predetermined strength and shape until it is heated and increased in temperature to a desired temperature and then can collapse, after a lapse of a predetermined time. The collapsible material of the present invention is characterized by comprising a base formed of a hydrate of a hydraulic material and unexpanded vermiculite particles dispersed in the base. In the collapsible material of the present invention, it is preferable that the hydraulic material is formed of at least one of cement and gypsum and the unexpanded vermiculite particles are contained in an amount of 0.5 to 15 wt %. Also, in the collapsible material of the present invention, it is preferable that ash balloon particles are contained in an amount of 0.5 to 20 wt %. Further, in the collapsible material of the present invention, it is preferable that a coating film formed of a hydrate of the hydraulic material and silica powder is formed on the surface of the base.

11 Claims, 8 Drawing Sheets

U.S. PATENT DOCUMENTS

| | | | | |
|---|---|---|---|---|
| 3,563,790 A | * | 2/1971 | Pratt et al. | 431/326 |
| 4,288,346 A | * | 9/1981 | Hunter et al. | 502/2 |
| 4,472,201 A | * | 9/1984 | Ochi et al. | 106/706 |
| 5,130,184 A | * | 7/1992 | Ellis | 442/295 |
| 5,356,568 A | * | 10/1994 | Levine | 252/606 |
| 6,866,709 B1 | * | 3/2005 | Holbek | 106/38.3 |

FOREIGN PATENT DOCUMENTS

| | | | |
|---|---|---|---|
| JP | 58-068445 A | | 4/1983 |
| JP | 58-142323 A | | 8/1984 |
| JP | 59142323 A | * | 8/1984 |
| JP | 04-253546 A | | 9/1992 |
| JP | 05-271772 A | | 5/1995 |
| JP | 10-113745 A | | 5/1998 |

* cited by examiner

| Substance | Density kg/m³ | Specific heat J/(kg·K) | Thermal conductivity W/(m·K) | Phase change point °C | Latent heat J/kg |
|---|---|---|---|---|---|
| A | 7750 | 484.8 | 35.99 | 1535 | 271,700 |
| B | 2161.7 | 668.84 | 0.78722 | 800 | 161,348 |
| C | 2148.6 | 907.76 | 0.746 | 950 | 177,650 |
| D | 2900 | 648 | 1.974 | - | - |

COLLAPSIBLE MATERIAL, PLACEMENT RACK, INCINERATION METHOD, LOST-WAX MOLD, AND MOLD COLLAPSING METHOD

TECHNICAL FIELD

The present invention relates to a material exhibiting collapsibility after a lapse of a predetermined time following high-temperature heating, and relates to a collapsible material suitably used as a fire grate for use in, e.g. cremation.

BACKGROUND ART

As a system for cremation, a "roaster system" has been known. In the roaster system, cremation is performed by placing a coffin on a grid-form support called a fire grate. Since a space is created between the coffin and the bottom of a furnace by the fire grate, convection currents of air and heat smoothly flow in the furnace. Therefore, this system has an advantageously high combustion efficiency. However, the cremated bones are burned to the bottom through the fire grate for supporting the coffin. The burned bones (cremains) are collected by a heat-resistant steel plate or a catch pan formed of cast iron arranged in the furnace bottom; however, it is difficult to keep the form of human body.

Then, the present inventors proposed in Patent Document 1 that the fire grate is allowed to collapse during a cremation process. In the proposal of Patent Document 1, a low-melting point copper alloy is used as an element of a fire grate. When the element is heated, it is softened and melted. By this mechanism, the fire grate is allowed to collapse.

The proposal of Patent Document 1 is effective in that the cremains keep the form of human body; however, the copper alloy is mixed in the cremains. When the cremains and a metal different in color are present together, a bereaved family would feel uncomfortable when they pick up bones. Then, they proposed in Patent Document 2 to compose a fire grate of alumina-based hard ceramic having the same in color as white cremains. However, in the proposal of Patent Document 2, the fire grate does not collapse. Thus, burned bones go down through the fire grate and break into pieces.

Furthermore, Patent Document 3 discloses as follows. Since the shell coat layer for a cast has extremely high heat-resistance, the components thereof remain unchanged; however, the coat layer contains $SiO_2$ as a main component. Thus, it deteriorates at high temperature and becomes collapsible. In breaking and removing the shell coat layer, since collapsibility of the coat layer is enhanced, it is easy to take out a cast itself from the casting mold. However, the document does not disclose how to control the collapse, which varies in accordance with heat capacity changes depending upon the size of a cast.

Moreover, Patent Document 4 discloses that dolomite is added to a surface coat layer of a mold because the mold sticks to a cast, making it difficult to separate them. In addition, the document discloses that when dolomite is endothermically decomposed by the temperature of molten metal for a cast, the properties of the surface coat layer is modified, enhancing collapsibility. However, no information is provided as to collapse of a member maintaining the strength of the mold and provided outside the surface layer.

[Patent Document 1]
Japanese Patent Application Laid-Open No. 59-142323
[Patent Document 2]
Japanese Patent Application Laid-Open No. 7-119938
[Patent Document 3]
Japanese Patent Application Laid-Open No. 4-253546
[Patent Document 4]
Japanese Patent Application Laid-Open No. 10-113745

DISCLOSURE OF THE INVENTION

A collapsible material as mentioned above for use in the several applications must keep a predetermined strength and shape at the stage where it is heated and increased in temperature to a desired predetermined temperature and then collapse after a lapse of a predetermined time.

Accordingly, an object of the present invention is to provide a collapsible material capable of keeping a predetermined strength and shape at the stage where it is heated and increased in temperature to a desired predetermined temperature and then collapsing after a lapse of a predetermined time.

The present inventors conceived an idea of using unexpanded vermiculite, although it is usually used after being expanded by heat-treating at 800° C. or more. In short, the present invention is characterized in that a material is collapsed by use of expansion of vermiculite which has remained unexpanded up to the time of actual use at a high temperature. As the base of the material, the present invention employs a hydraulic material in consideration of heat resistance, manufacturability (enabling easy modification/manufacturing of the shape), safe-disposability of waste after collapse and recyclability thereof. More specifically, the collapsible material of the present invention is constituted of a base composed of a hydraulic material and unexpanded vermiculite particles dispersed in the base and characterized in that a coating formed of at least one of a hydrate of the hydraulic material, silica powder and dolomite is formed on the surface of the base.

In the collapsible material of the present invention, at least one of cement and gypsum can be used as the hydraulic material.

In the collapsible material of the present invention, the unexpanded vermiculite particles are contained preferably in an amount of 0.5 to 15 wt %.

The collapsible material of the present invention may further contain 0.5 to 20 wt % of ash balloon particles.

As use of the collapsible material of the present invention, the present invention proposes a placement rack for placing an object to be incinerated thereon. Specific examples of the placement rack may include placement racks such as a fire grate for placing a coffin housing remains thereon in cremating the remains. The present invention also proposes a method for incinerating an object to be incinerated placed on the placement rack by creating a space under the placement rack having the object to be incinerated placed thereon.

The present invention further proposes a lost-wax mold containing any of the aforementioned collapsible materials and still further proposes a method of collapsing a mold characterized by collapsing a lost-wax mold containing any of the aforementioned collapsible materials by use of thermal expansion force of unexpanded vermiculite.

When the collapsible material of the present invention is heated to a high temperature, unexpanded vermiculite particles dispersed in the base are expanded. When the unexpanded vermiculite particles are heated to, for example, about 800° C., they expand 10 fold or more in volume. Consequently, the base collapses. On the other hand, the unexpanded vermiculite particles are dispersed in the base formed of a hydraulic material and a coating serves as an insulating material for the unexpanded vermiculite particles. Therefore, even if the ambient temperature increases, the temperature of the unexpanded vermiculite particles is not immediately increased to the aforementioned temperature. In other words, collapse of the collapsible material of the present invention is delayed from temperature increase. Therefore, according to the collapsible material of the present invention, the collapsible material can keep a predetermined strength and shape at the stage where it is heated and increased in temperature to a predetermined temperature to be desired, and then, collapses after a lapse of a predetermined time.

DESCRIPTION OF SYMBOLS

1 . . . Experimental furnace
2 . . . Burner (combustion apparatus)
3 . . . Openable door
4 . . . Receiver
5 . . . Inner wall of furnace
6 . . . Chimney
71, 72 . . . Temperature sensor
TP . . . . Test piece

BEST MODE FOR CARRYING OUT THE INVENTION

The present invention will be more specifically described below.

The collapsible material of the present invention is composed of a base formed of a hydraulic material and unexpanded vermiculite particles dispersed in the base.

The base is a portion imparting a predetermined shape, mechanical strength and heat resistance to the collapsible material of the present invention. Also, the base peels off from the surface and collapse by developing cracks as the unexpanded vermiculite particles are heated and expanded. The base is composed of a hydrate of a hydraulic material in expectation of these functions.

<Hydraulic Material>

The hydraulic material is selected from at least one of cement and gypsum.

The cement in the present invention includes alumina cement, Portland Cement and a cement mixture using this as a base. The quality of Portland Cement is defined by JIS R 5210. Regular Portland Cement, rapid and strong Portland Cement, super-rapid and strong Portland Cement, medium-heat Portland Cement and low-heat Portland Cement, etc. are known. As the cement mixture, Portland Cements to which blast furnace slag, fly ash or siliceous admixture is added are known. These complex cements are defined by JIS R 5211 to 5213. In the present invention, the aforementioned types of cements can be used singly or as a mixture thereof.

As the hydraulic material of the present invention, gypsum may be used singly or in combination with cement.

The gypsum, as is known well, contains calcium sulfate ($CaSO_4$) as a main component. In the present invention, powdery calcined gypsum (hemihydrate gypsum) composed of calcium sulfate.½ hydrate ($CaSO_4 \cdot \frac{1}{2}H_2O$), which is used as a raw material, is hydrated and hardened to produce calcium sulfate dihydrate ($CaSO_4 \cdot 2H_2O$). Therefore, the gypsum constituting the base is the dihydrate gypsum.

In the present invention, water to be added to the hydraulic material may be controlled by a technique known in the art. Furthermore, in the present invention, although an aggregate is generally added to a hydraulic material, it is not necessary to add such an aggregate. However, the aggregate may be added as long as it does not negate the effect of the present invention.

<Unexpanded Vermiculite Particles>

The hydraulic material of the present invention has unexpanded vermiculite particles dispersed in the base as mentioned above.

Usually, vermiculite is heated to expand to form a porous body, which is put in use. Therefore, vermiculite is excellent in heat insulating property and sound absorption and is thus often used as a material (filler or extending agent) to be blended with a base and further used as a base for various types of construction materials including a heat insulator and a sound absorber also in order to reduce weight. In contrast, the present invention is characterized in that the unexpanded vermiculite particles are used as a trigger for collapsing the base, as described above.

Vermiculite has a structure formed by stacking layers in the ratio of 2:1 wherein the layers comprise an octahedral layer which is dioctahedral or trioctahedral, and water molecules are present in the space between the layers.

According to the differential thermal analysis curve of vermiculite, there are three endothermic peaks in the range of 320° C. or less and the second peak of them present at 180° C. is the largest. These peaks are formed by dehydration of interlayer water. Part of the interlayer water still remains even vermiculite is passed through these temperature processes and forms a weak endothermic peak at 500 to 600° C. for dehydration.

The unexpanded vermiculite particles containing water molecules in the interlayer regions are dispersed in the aforementioned base having a low thermal conductivity. Thus, in the beginning, low temperature is maintained. However, when the temperature of the unexpanded vermiculite particles gradually increases, expansion occurs.

It is known that the unexpanded vermiculite expands when it is heat-treated at 800° C. or more. The present inventors investigated the expansion initiation temperature by using an experimental furnace while increasing the maximum temperature to be set by a unit of 50° C. from 600° C. As a result, a test piece TP molded of the unexpanded vermiculite particles caused no change at 650° C. even after one hour. However, when the test piece was maintained at 700° C. for one hour, vermiculite expanded and test piece TP turned into a coarse agglomerate of vermiculite. From the results, it was found that unexpanded vermiculite particles start expansion at 700° C.

With respect to the amount of the unexpanded vermiculite particles to be dispersed, if the content thereof is low, the time to complete collapse tends to be long. Conversely, if the content is large, the time to complete collapse tends to be short. Therefore, based on the tendency, the content may be appropriately set depending upon the time etc. from reaching a predetermined temperature to completing collapse. However, if the content is extremely low, collapse may not proceed sufficiently; on the other hand, if the content is extremely large, the shape cannot be maintained at a predetermined temperature. Accordingly, in the present invention, it is preferred that the content of the unexpanded vermiculite particles is set to fall within the range of 0.5 to 15 wt %. The content of the unexpanded vermiculite particles is more preferably 1 to 8 wt %, and further preferably 2 to 6 wt %.

The particle diameter of the unexpanded vermiculite particles is not particularly limited. However, if the particle diameter is large, it becomes difficult for the particles to disperse uniformly in the base. For this reason, the particle diameter of the unexpanded vermiculite particles is preferably 2.5 mm or less, more preferably 2 mm or less, and further preferably 1.5 mm or less.

The collapsible material of the present invention may contain ash balloon other than the hydraulic material and unexpanded vermiculite particles described above. The ash balloon is fine and hollow particles obtained by calcining natural volcanic ash at about 1000° C. and permitting it to foam. Since ash balloon has a low thermal conductivity, the thermal conductivity of the base can be reduced by having ash balloon contained in a base. Thus ash balloon plays a role in extending the collapse time. When the content of ash balloon is extremely low, the effect thereof cannot be obtained; on the other hand, when the content of ash balloon is extremely large, the strength of the base decreases. Therefore, it is preferred that the content of ash balloon is appropriately selected in the range of 0.5 to 20 wt %.

The particle diameter of ash balloon is not particularly limited; however, it is preferably 2.5 mm or less, more preferably 2 mm or less, and further preferably 1.5 mm or less.

In the collapsible material of the present invention, a base can be covered with a coating film formed of at least one of a hydrate of a hydraulic material, silica powder and dolomite. The coating film has an effect on extending the collapse time of the collapsible material.

As the hydraulic material of the coating film, the same hydraulic material as that constituting the base may be used; however, according to the studies of the present inventors, a combination of alumina cement and calcined gypsum is preferred. Calcined gypsum is hardened by hydration and turns into gypsum.

Figure 3:
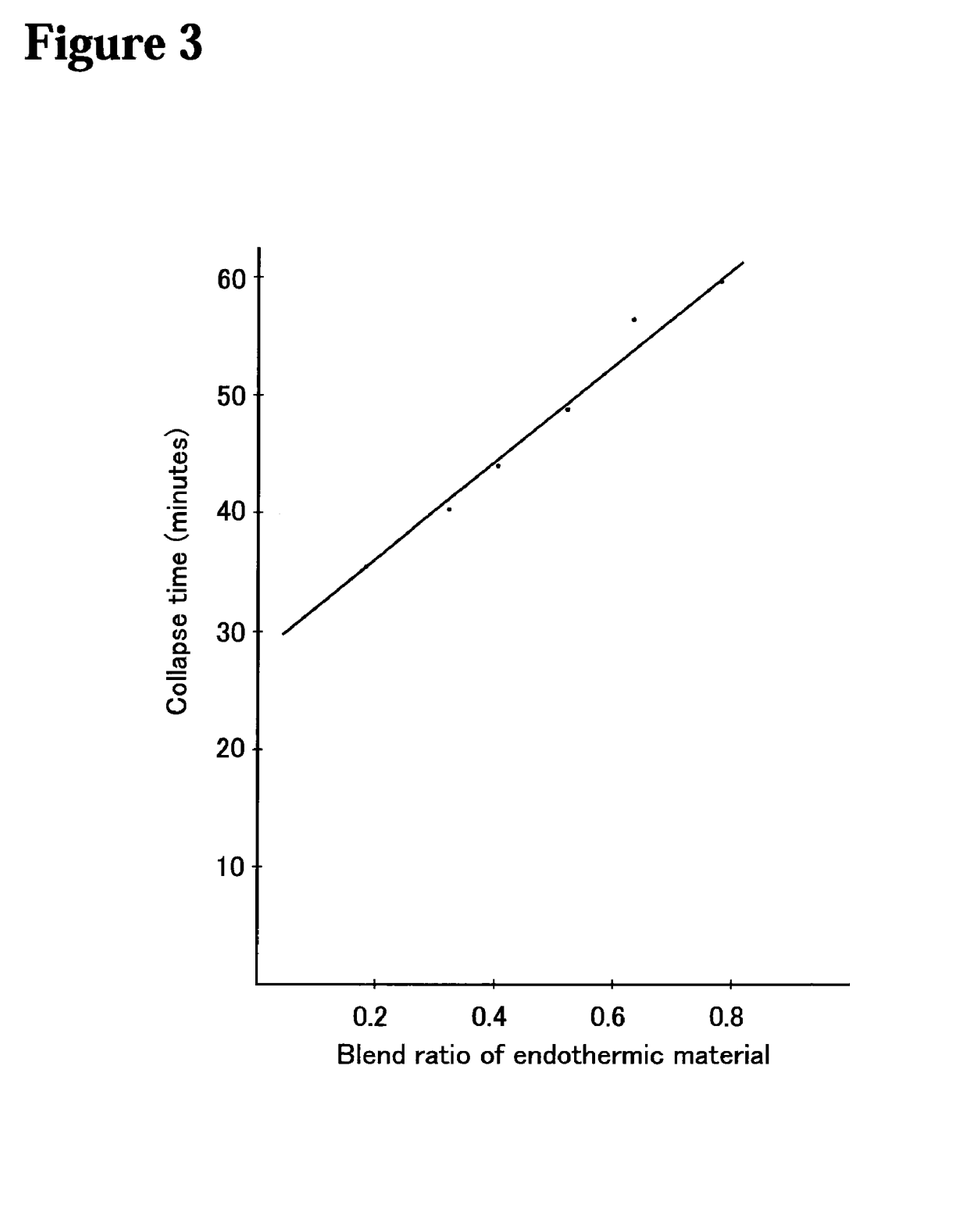
FIG. 3 is a graph showing the relationship between collapse time and a blend ratio of an endothermic material (silica powder)

The collapse time of the collapsible material can be controlled by the amount of silica powder contained in the coating film. The relationship between the collapse time and the blend ratio of silica powder (an endothermic material manufactured by A & A Material Corporation) is shown in FIG. 3. As shown in FIG. 3, as the blend ratio of silica powder increases, in other words, as the amount of silica powder contained per unit volume increases, the collapse time becomes long. The time for unexpanded vermiculite particles to reach the temperature for starting expansion is delayed by the endothermic energy of the silica powder contained in the coating film. The amount of the endothermic energy is proportional to weight of the silica powder (weight of the silica powder per unit weight of the coating). Since the collapse time can be extended by the silica powder contained, the collapse time can be extended also by increasing the thickness of the coating film.

To describe the state varying with time more specifically, the following change occurs in the coating film and the collapsible material.

For example, when a collapsible material having a coating film formed thereon is placed in an atmosphere of 800° C., the surface temperature of the coating film rapidly increases. The thermolysis of a hydrate capable of decomposing at 100° C. or less is immediately completed. When the temperature reaches 100° C., the temperature of the collapsible material is maintained at 100° C. in the period during which free water and adhesion water evaporate since water takes evaporation heat when it evaporates.

Heat flux flows in the interior of the collapsible material up to 100° C. The temperature increases beyond this for the first time after water contained in the interior of the coating film is completely evaporated. In the range from 100° C. to 700° C., hydrates are decomposed in the ascending order of thermolysis temperature. Since the endothermic reaction is continued during the thermolysis thereof, the temperature increase of the collapsible material is delayed.

Figure 4:
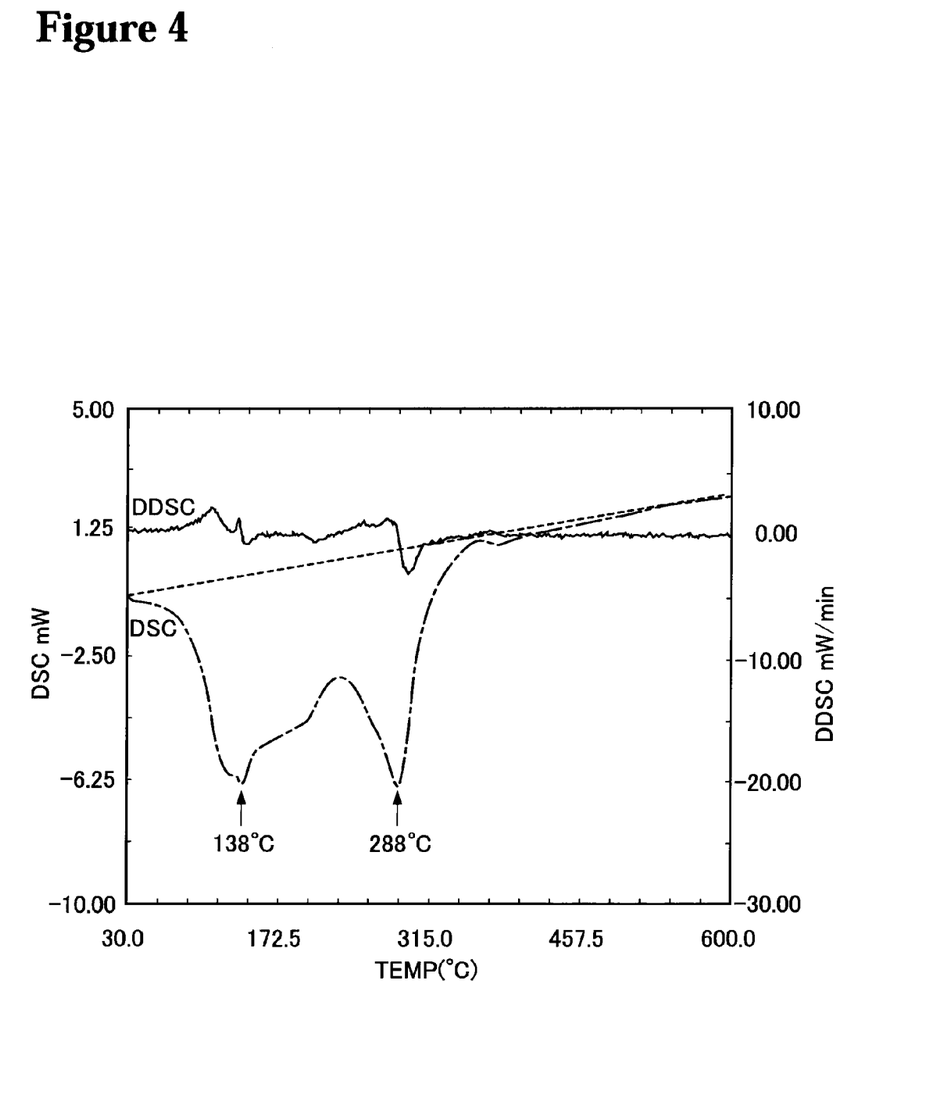
FIG. 4 is a graph showing endothermic characteristics of a hydrate in the coating.

To confirm that such a phenomenon occurs in the coating film, an endothermic phenomenon caused by thermolysis of hydrates was measured by means of a differential scanning calorimetry device. Measurement was performed after hydration of a sample was terminated and free water was removed. The results are shown in FIG. 4. As is apparent from FIG. 4, since clear endothermic peaks are observed at about 140° C. and about 290° C., it was confirmed that the hydrates contained in the coating film are decomposed.

Since the temperature of the collapsible material does not reach 700° C. in the period during which thermolysis proceeds at 650° C. or less, unexpanded vermiculite particles dispersed in the base would not expand. The collapsible material still remains uncollapsed. After hydrates that decompose by thermolysis at 650° C. or less are consumed, the temperature of the collapsible material reaches 700° C. and the unexpanded vermiculite particles dispersed therein start expansion one after another. Collapse starts from the portion that first reaches a collapse initiation temperature. In a test using a rectangular parallelepiped test piece TP, collapse starts from both ends of the test piece TP in the longitudinal direction.

The collapsible material according to the present invention may be used in a placement rack for placing an object to be combusted. As the placement rack, a fire grate may be mentioned. According to the present invention, after an object to be combusted is incinerated, the fire grate is collapsed. This idea has been disclosed by the present inventors in Patent Document 1. However, in Patent Document 1, a fire grate is collapsed by use of mechanical properties due to temperature change of a copper alloy based material having a low melting point and no disclose is made of control of the collapse time by extending or shortening the collapse time. After Patent Document 1, Patent Document 2 discloses an incineration method performed by disposing a square-bar fire grate in the form of a square column having an opening portion at the side surface on the carriage of a cremation furnace and placing a coffin on the fire grate and performing incineration. This is a fire grate in which combustion gas and oxygen can be fed from a center cavity of the square bar to the space between the coffin and the upper surface of the furnace, and was conceived in order to make the use of the merits of the roaster system in a carriage system. According to the carriage system, bones would not be burned to the bottom and the form of human body remains, with the result that a bone can be taken out from orderly arranged cremains. On the other hand, Patent Document 5 discloses a continuous-system cremation furnace capable of continuously performing cremation and providing satisfactory combustion efficiency and thermal efficiency, saving energy, simplifying maintenance management, and obtaining colorless and odor-free waste gas. The cremation furnace is constituted of a front chamber and a main combustion chamber. Before a coffin is transferred to the front chamber, the main combustion chamber is preheated to obtain the atmosphere having a temperature of 800° C. According to Patent Document 5, combustion of remains is completed for about one hour.

[Patent Document 5]
Japanese Patent Application Laid-Open No. 9-250718

To improve combustion efficiency, it is preferred to place a coffin on a fire grate. However, when a fire grate is used, bone drops through the slit between grids. Therefore, it is necessary to reduce the size of the slit between grids or employ a board-form grate to prevent bone from dropping. It is the most ideal that combustion efficiency is high and that burned bone, after the bones are completely burned, can be placed on the upper surface of a furnace bottom while keeping the form of human body.

One of the methods for realizing such an ideal figure is manufacturing a fire grate in accordance with the size (larger or smaller) of remains and providing the fire grate with small holes, which are sufficient to drop no bone and to apply flame also below the remains. In addition, even incineration of the remains is completed on the fire grate, the bones are further baked, thereby performing sufficiently calcination and thereafter the fire grate is placed on the bottom surface of the carriage furnace.

As a method of placing the fire grate on the upper bottom surface of the carriage furnace, there are a method of placing an intact fire grate on the bottom surface of a furnace and a method of breaking the fire grate and placing the broken fire grate on the upper bottom of the furnace. An operation for leaving the shape of the fire grate as it is must be performed by the operator and how to dispose the fire grate as post treatment is a problem. It would be ideal if a fire grate is collapsed after bone is further baked. If bereaved family members pick up bones and dispose ashes; at the same time, use a vacuum cleaner to dispose collapse wreckage of the fire grate, it is possible to eliminate dirty, dangerous and demeaning work.

Such an ideal fire grate can be manufactured by use of the collapsible material of the present invention. This is because if the collapsible material of the present invention is used, a fire grate that can withstand temperature of 800° C. for one hour and thereafter collapse can be obtained, as described in Examples (later described).

The height and weight of remains vary depending upon a child to an adult. Therefore, it is required to have a function of controlling the collapse time in accordance with the conditions of remains. To obtain the structure of a fire grate that never drops small bones, it is desirable to use a material from which the structure can be easily manufactured even if the structure is complicated. The collapsible material of the present invention has such a function.

Therefore, according to the present invention, a fire grate capable of incinerating remains in ideal conditions is provided and a method of incinerating remains can be provided, which involves a coffin housing remains, a fire grate supporting the coffin, providing a space under the fire grate, and further involves baking the remaining bone after incineration of the remains, and permitting the fire grate to collapse into particles. Further, collapsible fire grate can be provided.

According to the present invention, in incinerating remains, since the remains can be completely incinerated while placing the remains in a high-temperature atmosphere, work performed by using a tool such as a poker can be eliminated. Furthermore, even if the conditions of remains change, the time of baking bone can be controlled. The ashes after remains are incinerated are the ashes obtained after incineration at a high temperature of 800° C. Since no organic substance is contained, the ashes can be recycled as an aggregate for cement.

The collapsible material of the present invention is used in a casting mold, if it is applied to a layer outside a surface coat layer in contact with molten metal as disclosed in Patent Documents 3 and 4, the mold can be collapsed. To be more specifically, when the molten metal coagulates, heat of melting is diffused from the mold surface coat layer, which is the border between the mold and the molten metal, outside the mold. By adding unexpanded vermiculite to the next layer of the surface coat layer, the temperature of the layer containing unexpanded vermiculite can be increased up to 800° C. by diffusion heat. The mold can be collapsed also in the same manner as collapse of the fire grate.

Example 1

The present invention will be described more specifically below by way of examples.
<Test Piece>

The rectangular parallelepiped test piece TP formed in this example has a size (40 mm×40 mm×250 mm) generally used in a mortar test. The test piece TP corresponds to the collapsible material of the present invention.

If necessary, a coating film is formed on the surface of the test pieces so as to have a thickness of about 3.2 to 4.0 mm. Note that since collapse proceeds fast at the end portions of the test piece in the longitudinal direction as described above, the film was made thicker.

The raw material of the collapsible material was injected into a predetermined frame. After 24 hours, a coating film was formed and maintained for 48 hours after that. Thereafter, the frame was broken and allowed to stand still. The test piece TP of 14-day material age was subjected to a collapse test.
<Specification of Experimental Furnace>

Figure 1:
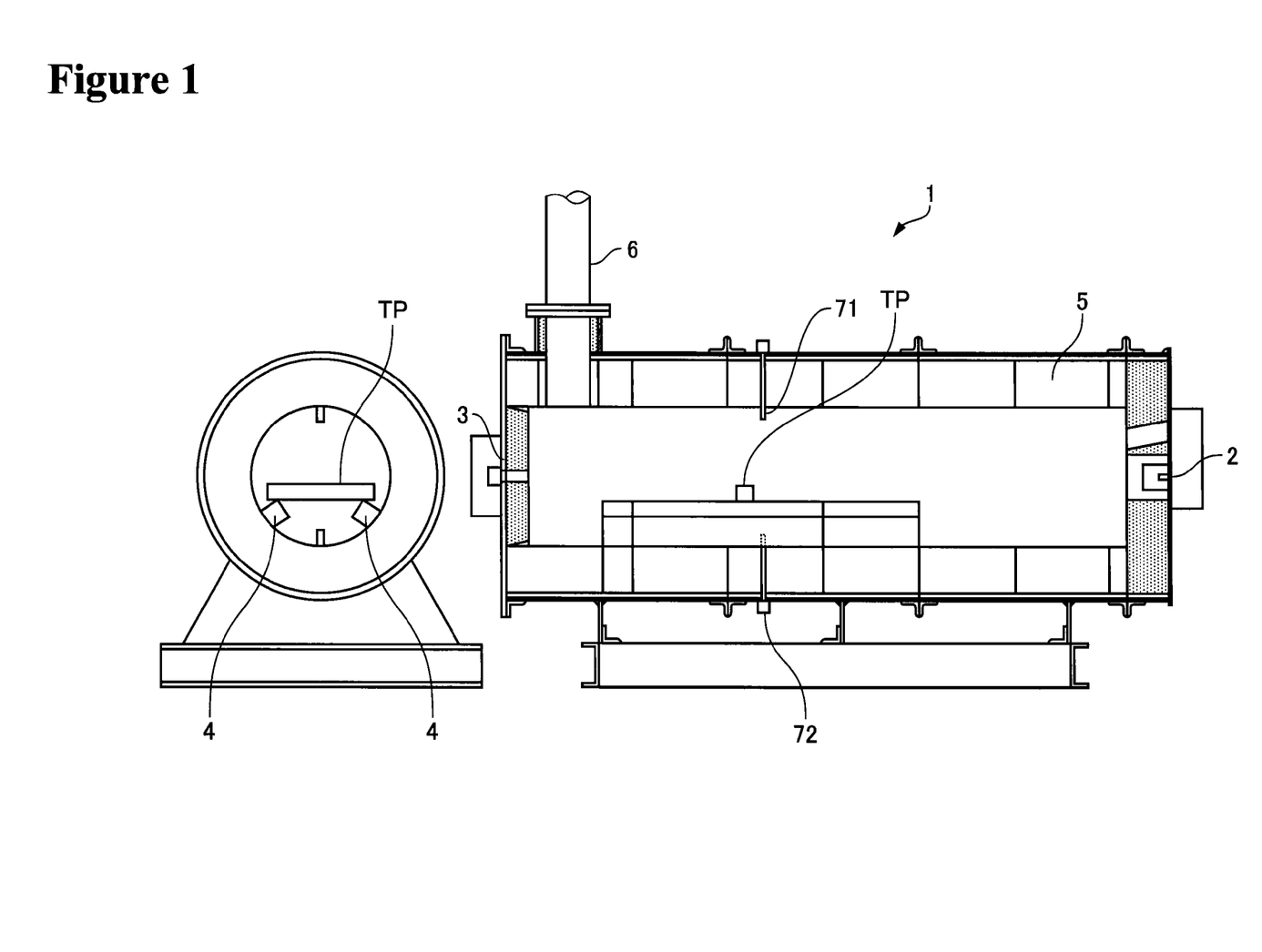
FIG. 1 is a view illustrating the structure of an experimental furnace.

An experimental furnace 1 shown in FIG. 1 was manufactured and the collapse test was performed. The experimental furnace 1 has an inner diameter of 330 mmφ, a length of 1400 mm and a volume of 0.12 m$^3$. The furnace was heated by a burner (combustion apparatus) 2 and the inner temperature of the furnace was allowed to maintain at 800° C. by a method of controlling ON-OFF of an electromagnetic valve for supplying fuel oil by an electric signal of a thermocouple.

When the furnace temperature decreases from 800° C. to 450° C., an openable door 3 is opened to place the test piece TP on receivers 4. The set-up position of the test piece TP is the center position of the experimental furnace 1. A large space was provided under the test piece TP. The receivers 4 for supporting the end portions of the test piece TP protrude from the furnace wall. The inner wall 5 of the furnace was formed of assembled firebricks and combustion gas is exhausted through a chimney 6 outside the furnace.
<Confirmation of Temperature-Rising Characteristic of Experimental Furnace>

Figure 2:
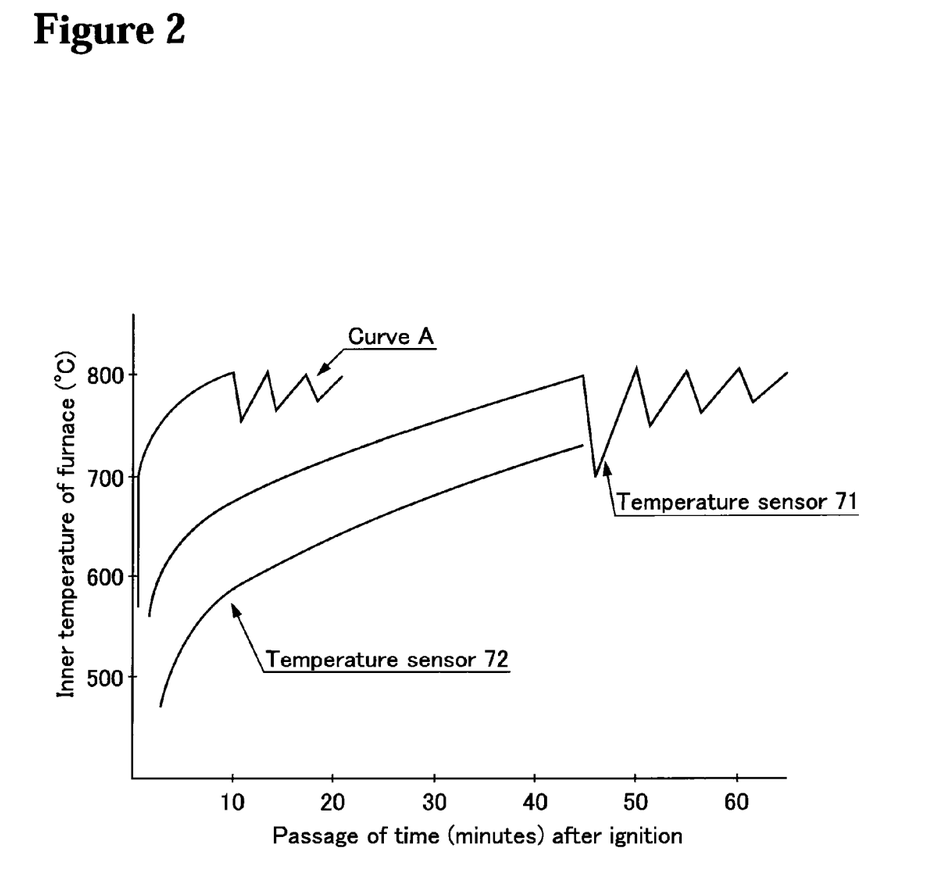
FIG. 2 is a graph showing an increase curve of the inner temperature of the furnace.

In the experimental furnace 1 as described above, the relationship between temperature increase and the passage of time was checked by temperature sensors (thermocouples) 71, 72 attached to the top and bottom of the experimental furnace 1. The results are shown in FIG. 2. At the position of the temperature sensor 71, a time-period of about 40 to 45 minutes is required to reach 800° C. under the first ignition/heating conditions. At the position of the temperature sensor 72 (45 mm above from the furnace surface), even after 40 to 45 minutes, the temperature only reached 735° C. in the first ignition/heating conditions. Under the same conditions, the temperature at the upper surface (upper surface of the bricks)

of the furnace bottom, which is lower by 45 mm than the position of the lower temperature sensor 72, reached only 570° C. at most even after one hour. A collapse test was performed as follows. After the temperature reached 800° C., the burner (combustion apparatus) 2 was turned off to reduce the temperature to 450° C. A test piece TP was placed on a predetermined position for the experiment. Ignition is turned on again to start heating. The time required for the temperature to reach 700° C. after the re-ignition was measured. The results are shown by a curve A in FIG. 2. Since the experiment was continuously performed in the same manner, the time required for the temperature to reach 700° C. was recorded every time turn-on and off of the burner was repeated. As a result, the time at a first re-ignition was one minute and 15 seconds, the time at a second re-ignition was one minute and 10 seconds, the time at a third re-ignition was one minute and 5 to 10 seconds and the time at a fourth re-ignition was one minute 5 to 10 seconds. The difference between them was found to fall within 20 seconds or less. Although the predetermined set position of the test piece TP was higher only by 45 mm than that of the lower temperature sensor 72, the temperature reached 700° C. at the position higher at least by 45 mm from the furnace surface. Thus, it was considered that a collapse test can be carried out. Furthermore, since the difference of time periods required for reaching 700° C. falls within the aforementioned constant range, the temperature increase rate would not affect time to expansion of vermiculite. For this reason, the conditions for placing the test piece TP in the experimental furnace 1 were determined as follows. The temperature of the experimental furnace 1 increases once to 800° C. and then heating is stopped. When the temperature reaches 450° C., the test piece TP is set. Note that the temperature sensors 71 and 72 are designed to change the measurement positions.

The raw materials for a collapsible material shown in Table 1 were prepared and test pieces TP formed of the collapsible materials were prepared. Furthermore, the raw materials for forming a coating film shown in Table 1 were prepared and slurry samples were prepared for forming the coating films and molded onto the surface of the test pieces TP as needed. The manner of preparing test pieces is as mentioned above.

The obtained test pieces TP were subjected to a collapse test performed by using the aforementioned experimental furnace 1. The results are also shown in Table 1. Note that, in Table 1, the content of unexpanded vermiculite (excluding water) in a collapsible material is 3.85 wt %.

Note that the following materials were used as the raw materials.

Alumina cement (coating film): Taiheiyo Cement Corporation, Taiheiyo Alumina Cement No. 1

Alumina cement (collapsible material): LAFARGE ALUMINATES SEGAR-51

Calcined gypsum: Yoshino Gypsum Co., Ltd., calcined gypsum grade A

Ash balloon: Marunaka Hakudo Co., Ltd., MAALITE BA-15

Unexpanded vermiculite: imported by Sojitz Corporation, raw ore produced at the Palabora mine of the Republic of South Africa

TABLE 1

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapsible material alone | Collapse time of collapsible material with coating film |
| 400 | 100 | 50 | 50 | 24 | 280 | — | — | — | — | 21.9 | — |
| 400 | 100 | 50 | 50 | 24 | 280 | 135 | 10.8 | 65 | 240 | — | 40.30 |
| 400 | 100 | 50 | 50 | 24 | 280 | 95 | 7.6 | 105 | 350 | — | 48.72 |
| 400 | 100 | 50 | 50 | 24 | 280 | 40 | 3.2 | 140 | 430 | — | 59.33 |

Sample No. 1 of Table 1 collapses for 21 minutes and 54 seconds. This value is an average of 10 test pieces TP. Since a variation σ=33, the collapse time is sufficiently reproducible. Note that the collapse time refers to a time period during which the test piece collapses and drops from the receivers 4 after temperature increased again to 800° C. from 450° C.

Sample Nos. 2 to 4 of Table 1 are collapsible materials covered with coating films having silica powder blended therein in ratios providing respective collapse time of 40, 50 and 60 minutes, which are obtained from FIG. 3. The collapse times of these samples were actually 40 minutes and 18 seconds compared to target time: 40 minutes, 48 minutes and 43 seconds compared to target time: 50 minutes, and 59 minutes and 20 seconds compared to target time 60 minutes, respectively. The variance σ was at most 1.05. From this, it was confirmed that reproducibility is considerably high.

FIG. 4 is a chart showing thermal characteristics of a coating film measured by differential scanning calorimetry. DDSC is a derivative of DSC. A point of inflection (peak value) is a point at which a substance causes an endothermic reaction. The DDSC curve has a great many points of inflection, meaning that there are many substances involved in endothermic reactions. It was found that a great many types of hydrates are totally used and involved in a function of delaying time to collapse owing to an endothermic reaction.

Example 2

In Example 2, a collapse test was performed in the same manner as in Example 1 except that the blend ratio of alumina cement to regular cement was varied as shown in Table 2. The results are also shown in Table 2. As a result, it was found that the collapse time of the collapsible material alone was 19 minutes and that of the collapsible material with a coating film was about 47 minutes.

TABLE 2

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapsible material alone | Collapse time of collapsible material with molded film |
| 250 | 250 | 50 | 50 | 24 | 280 | — | — | — | — | 19.05 | — |
| 300 | 200 | 50 | 50 | 24 | 280 | 95 | 7.6 | 105 | 350 | — | 45.25 |
| 200 | 300 | 50 | 50 | 24 | 280 | 95 | 7.6 | 105 | 350 | — | 47.50 |
| 100 | 400 | 50 | 50 | 24 | 280 | 95 | 7.6 | 105 | 350 | — | 47.10 |

Example 3

In Example 3, a collapse test was performed in the same manner as in Example 1 except that either one of alumina cement and regular cement and calcined gypsum were contained as the hydraulic material as shown in Table 3. The results are also shown in Table 3.

It was found that even if calcined gypsum and either one of alumina cement and regular cement were contained, sufficient collapse time was able to be obtained. Furthermore, it was found that use of alumina cement makes the collapse time become longer.

Example 5

In Example 5, a collapse test was performed in the same manner as in Example 1 except that calcined gypsum alone was contained as the hydraulic material and the content of unexpanded vermiculite was varied, as shown in Table 5. The results are also shown in Table 5.

As shown in Table 5, when no unexpanded vermiculite particles are contained, the test piece TP did not collapse even after 60 minutes. Furthermore, when the content of unexpanded vermiculite particles increases, the collapse time tends to become shorter. From the results, it was found that the collapse time can be controlled by varying the content of unexpanded vermiculite particles.

TABLE 3

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapsible material alone | Collapse time of collapsible material with molded film |
| 500 | 0 | 50 | 50 | 24 | 280 | — | — | — | — | 24.25 | — |
| 500 | 0 | 50 | 50 | 24 | 280 | 95 | 7.6 | 105 | 350 | — | 51.3 |
| 0 | 500 | 50 | 50 | 24 | 280 | — | — | — | — | 17.4 | — |
| 0 | 500 | 50 | 50 | 24 | 280 | 95 | 7.6 | 105 | 350 | — | 40.5 |

Example 4

In Example 4, a collapse test was performed in the same manner as in Example 1 except that alumina cement alone or regular cement alone was contained as the hydraulic material, as shown in Table 4. The results are also shown in Table 4.

From the results shown in Table 4, it was found that even if calcined gypsum is not contained, sufficient collapse time was able to be obtained.

TABLE 4

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapsible material alone | Collapse time of collapsible material with molded film |
| 500 | 0 | 0 | 50 | 24 | 210 | — | — | — | — | 24.40 | — |
| 400 | 100 | 0 | 50 | 24 | 225 | — | — | — | — | 19.35 | — |
| 250 | 250 | 0 | 50 | 24 | 200 | — | — | — | — | 18.85 | — |
| 100 | 400 | 0 | 50 | 24 | 225 | — | — | — | — | 23.85 | — |
| 0 | 500 | 0 | 50 | 24 | 200 | — | — | — | — | 17.65 | — |
| 0 | 500 | 0 | 50 | 24 | 200 | 95 | 7.6 | 105 | 350 | — | 40.85 |
| 500 | 0 | 0 | 50 | 24 | 210 | 95 | 7.6 | 105 | 350 | — | 51.50 |

TABLE 5

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapse time Collapsible material alone | of collapsible material with molded film |
| 0 | 0 | 500 | 50 | 0 | 290 | — | — | — | — | No collapse occurs for 60 min | — |
| 0 | 0 | 500 | 50 | 10 | 290 | — | — | — | — | 26.4 | — |
| 0 | 0 | 500 | 50 | 20 | 290 | — | — | — | — | 20.1 | — |
| 0 | 0 | 500 | 50 | 30 | 290 | — | — | — | — | 18.05 | — |

Example 6

In Example 6, a collapse test was performed in the same manner as in Example 1 except that the content of ash balloon was varied as shown in Table 6. The results are also shown in Table 6.

As shown in Table 6, when alumina cement and regular cement were used as the hydraulic material, as the content of ash balloon increases, the collapse time becomes longer. On the other hand, when calcined gypsum is used as a hydraulic material, as the content of ash balloon increases, the collapse time becomes shorter.

The specific heat of alumina cement (836 J/(kg·K)) is almost equal to that of gypsum (1087 J/(kg·K)); however, the thermal conductivity of alumina cement is 0.812 W/(m·k) and that of gypsum is 0.162 W/(m·k). Therefore, alumina cement transfers heat 5 fold as fast as gypsum. As shown in Table 6, a material formed of alumina cement having a high thermal conductivity to which 100 g of ash balloon having a small thermal conductivity (0.0812 W/(m·k)) was added had the same thermal conductivity as that of a material formed of gypsum having a relatively small thermal conductivity to which no ash balloon was added. Therefore, collapse times of them are also almost equal. If the addition amount of ash balloon serving as a heat insulating material, which suppresses heat flux from alumina cement having a high thermal conductivity, is reduced from such balanced conditions, the thermal conductivity increases as a natural consequence and the collapse time becomes short. In the case of gypsum, since the thermal conductivity of ash balloon is about ½ of that of gypsum, even if ash balloon is added, the thermal conductivity decreases only slightly. Rather than this, since strength in high temperature of gypsum basically weak compared to that of alumina cement, resistance to expansion force of vermiculite may conceivably decrease by the reduced content of gypsum in order to add ash balloon.

TABLE 6

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapse time Collapsible material alone | of collapsible material with coating film |
| 400 | 100 | 50 | 0 | 24 | 195 | — | — | — | — | 16.3 | — |
| 400 | 100 | 50 | 50 | 24 | 280 | — | — | — | — | 17.45 | — |
| 400 | 100 | 50 | 100 | 24 | 390 | — | — | — | — | 20.15 | — |
| 0 | 0 | 500 | 0 | 20 | 190 | — | — | — | — | 20.5 | — |
| 0 | 0 | 500 | 50 | 20 | 290 | — | — | — | — | 17.55 | — |
| 0 | 0 | 500 | 100 | 20 | 390 | — | — | — | — | 16.5 | — |

Example 7

In Example 7, a collapse test was performed in the same manner as in Example 1 except that the composition of a hydraulic material constituting a coating film was varied as shown in Table 7. The results are also shown in Table 7.

As shown in Table 7, it was found that collapse time becomes longer when calcined gypsum is used instead of alumina cement.

TABLE 7

| Raw material for collapsible material [g] | | | | | | Raw material for coating film [g] | | | | Collapse time [min.] | |
| --- | --- | --- | --- | --- | --- | --- | --- | --- | --- | --- | --- |
| Alumina cement | Regular cement | Calcined gypsum | Ash balloon | Unexpanded vermiculite | Water | Alumina cement | Calcined gypsum | Silica powder | Water | Collapse time Collapsible material alone | of collapsible material with molded film |
| 0 | 0 | 500 | 50 | 20 | 290 | 95 | 7.6 | 105 | 350 | — | 34.1 |
| 0 | 0 | 500 | 50 | 20 | 290 | 0 | 95 | 105 | 350 | — | 44.1 |

Example 8

To demonstrate that when the collapsible material used in Example 1 was used as a fire grate, "after cremation of remains is completed, bone is further baked and then the fire grate collapses", a cremation test was performed using a broiler chicken.

Test pieces TP were assembled in the form of fire grate. The broiler chicken was placed on the fire grate and combusted. Experimental conditions are as follows. After the experimentation furnace 1 was heated once to 800° C., a burner was turned off and then the broiler chicken was loaded. The experiment was performed by setting the weight of combustion materials to be the same and varying the conditions of the fire grate and the conditions for the space under the fire grate. The details thereof are shown in Table 8. More satisfactory experimental results were obtained in Scheme A according to the present application than Scheme B simulating a conventional experimental design. In Scheme A where the collapse time of the fire grate was set at 60 minutes and the same collapsible material as in Example 1 was used, the time to collapse delayed by 9 minutes. The residue dropped after 69 minutes was wrapped with aluminum foil, transferred into a steel can. The steel can was covered with a lid and heated again at 800° C. for 30 minutes. The can was taken out and the residue was separated from the aluminum foil and weighed by a balance. No weight change was observed.

TABLE 8

| Incineration method | Scheme A | Scheme B |
|---|---|---|
| Condition 1 | Number of test pieces TP: 3 | Board of 3 mm in thickness |
| Fire grate | Metallic mesh | |
| Condition 2 | Interval with upper surface of furnace bottom | Interval with upper surface of furnace bottom |
| Space under fire grate | 90 mm | 50 mm |
| Condition 3 | Two broiler chickens | Two broiler chickens |
| Incineration material | 1.5 kg * 2 | 1.5 kg * 2 |
| Incineration time | 69 minutes | 69 minutes |
| Time of gradual cooling | 18 minutes | 18 minutes |
| Weight of residue | 70 g | 110 g |
| Characteristics of residue such as shape | No lump and no odor | Carbonized lump of 1000 cc Slight odor remains |

The amount of residue of Scheme A is lower than that of Scheme B and no odor remained. When a combustion material of Scheme A immediately before collapse was observed, the color of bones was the same as that of combustion gas, that is, highly transparent orange close to white. Large pieces of the remaining bone were broken. It was observed that small pieces (about 3 to 5 mm) of the remaining bone were connected to each other. From these results, it was confirmed that since the time required for the fire grate to collapse is longer than the time for a combustion material to combust, the combustion material completely combusts on the fire grate and thereafter can drop. The fact that the weight of the bone does not change even it is combusted again means that the combustion material has already and completely combusted and no organic substance to be combusted is left. In other words, the state of the bone, which was completely combusted followed by further burning, is the same as that of the bone left on the fire grate. It is demonstrated that the bone was further baked after combustion. If conditions of the remains are equal, the time for baking after combustion can be controlled by increasing endothermic energy of the coating film. This is a novel incineration method for remains.

The initial position of the combustion material in Scheme B is the same as that in Scheme A where test pieces TP were placed on the upper surface of the experimental furnace 1; however, the combustion material is supported by a wooden board in place of a fire grate. The space under the combustion material of Scheme B is set to be as narrow as 50 mm compared to 90 mm of Scheme A. This is arranged by inserting a ceramic board into the lower space of Scheme A. In Scheme B, the amount of the residue was larger than that of Scheme A and odor slightly remained.

The broiler chicken dropped on the ceramic board and combusted when the wooden board combusted. In the combustion test, combustion was performed in the experimental furnace 1 for 69 minutes in the same manner as in Scheme A and thereafter the experimental furnace 1 is turned off. The weight of the resulting residue was measured in Scheme B. The weight of the residue was larger by 40 g than that of Scheme A and larger by 57% than in Scheme A. Carbonized lump and slight odor remain. This demonstrates that bone was not completely combusted and bone with organic substance remained. The cause thereof is apparent from the temperature measurement shown in FIG. 2 and the temperature of the bottom surface of the experimental furnace 1 does not reach the combustion temperature for remains. At this time, the residue of Scheme B is heavier only by 57% than that of Scheme A. This may be estimated because the weight of the combustion material is low. Accordingly, even if a heavy combustion material is combusted by being spaced from the bottom surface of the experimental furnace 1, unless a specific operation is performed, when combustion of the bottom board supporting a coffin is completed, the remains comes into close contact with the bottom surface of the experimental furnace 1. However, since the remains are not in contact with combustion gas, the temperature of the remains decreases lower than 570° C. and may decrease to 500° C. or less, which is the combustion temperature of a protein. Since heat is applied to only the upper surface of the remains, the remains are baked as if baked in a covered pan, with the result that the portion of the remains in contact with the bottom surface of the experimental furnace 1 may be carbonized. For the reasons, it is impossible to burn the remains, at a small interval with the bottom, to white bones within one hour. From the results of Scheme A and Scheme B, it was demonstrated that combustion effect significantly changes by varying space conditions under the fire grate. Providing a space under the fire grate is an essential condition for complete automotive combustion.

In the experiment of combusting a broiler chicken, there is a difference between the predetermined collapses time (60 minutes) and the actual collapse time (69 minutes). The reason why the difference is larger than σ=1.05 of reproduction data can be explained based on the relationship between a collapsible material and the coating film in function. Since combustion of a protein starts from near 500° C., while combustion is carrying out in the vicinity of the temperature, the external temperature of the fire grate is considerably lower than 800° C. Therefore, the endothermic calorie consumption of endothermic material present inside the coating film slowly proceeds. Collapse of the collapsible material comes to delay by the delay of the consumption.

Remains produce the same effect as that produced by further arranging an endothermic material outside the coating film.

Furthermore, since heat flux flows in the fire grate when a temperature is still low, no significant temperature difference is produced by the heat flux within the fire grate. The effect corresponding to a function of mitigating thermal shock is conceivable.

Even if a combustion material is completely combusted, if the temperature of the collapsible material of a fire grate does not reach an expansion initiation temperature of vermiculite, no collapse occurs. For these reasons, it is natural that the collapse time of a test piece TP differs from the collapse time of the test piece having a combustion material placed thereon.

Since collapse of a fire grate is not caused by an oxidation reaction, no carbon dioxide is emitted. That is, the carbon dioxide output cannot be further augmented. Instead, since the fire grate is placed at a higher position to provide a space under remains, the remains are surrounded by a high-temperature atmosphere compared to a conventional method. Combustion proceeds both from the upper side and the lower side. Therefore, combustion time is expected to be shortened. This further leads to saving energy and reduction of the carbon dioxide output. Although comparison cannot be made since there is no disclosure of information on actual fuel consumption, it is principally expected to reduce consumption of fuel.

In the experiment, the fire grate is formed by arranging three test pieces next to each other. A cage of metallic mesh is formed so as not to drop small bone pieces. Two broiler chickens of 1.5 kg are just placed on the cage. Principally the same manner is employed in practice. A structure formed by placing a board on square bars laterally arranged or by connecting square bars to be placed on receivers may be employed. The shape of the fire grate similar to the shape of the roaster system conventionally used can be easily formed just by preparing a frame mold and only supplying the aforementioned raw material to the frame mold.

The fire grate for supporting an adult of 170 cm is considerably large. In addition, the material for the fire grate is a noncombustible material. Although water, which is a hydrate, is vaporized, main material, i.e., a hydraulic material, remains as it is. Treatment of the remaining ash becomes a problem. However, the remaining ash, which is baked at a high temperature of 800° C., contains no organic substances. The remaining ash, from which bone is removed, can be recycled as an aggregate for cement.

Example 9

In Patent Document 3, a second shell coat layer, which contains a member formed of nylon and disappearing at high temperature, is melted to allow the member to disappear, to form a mesh-form hollow portion. Since the strength of the mesh-form hollow portion is very low, the layer is rendered to be easily collapsible. This is a technique disclosed by Patent Document 3.

With respect to collapsibility of a lost-wax mold, a method for improving collapsibility by adding gypsum to a mold and applying heat to decompose the gypsum is disclosed in Patent Document 4. However, a technique for spontaneously collapsing a mold by adding a thermal expansion material and using the heat of molten metal has not yet been disclosed.

A raw material prepared by alumina cement containing vermiculite proposed by the present invention is prepared into slurry and used as a coating material for the second layer of the wax model. The first coating layer is formed of a composition containing alumina cement and 20 wt % of dolomite in order to quickly reduce the temperature of the molten metal. This is because when dolomite is decomposed by heat, it causes an endothermic reaction, which is used in order to quickly reduce the temperature of molten metal. The high temperature of molten metal poured into the mold is diffused by way of the first layer and the second layer. Therefore, the mold can be spontaneously collapsed by selecting components and film thickness of the first and second layers. The heat diffusion can be calculated in accordance with the equation on heat flux transfer by heat conduction known as the Fourier principle. Using a thermal conductivity and the physical properties defined, computer simulation is performed to confirm a temperature change of an object on the desk. The following results are obtained by setting the shape of the object under general conditions.

Figure 5:
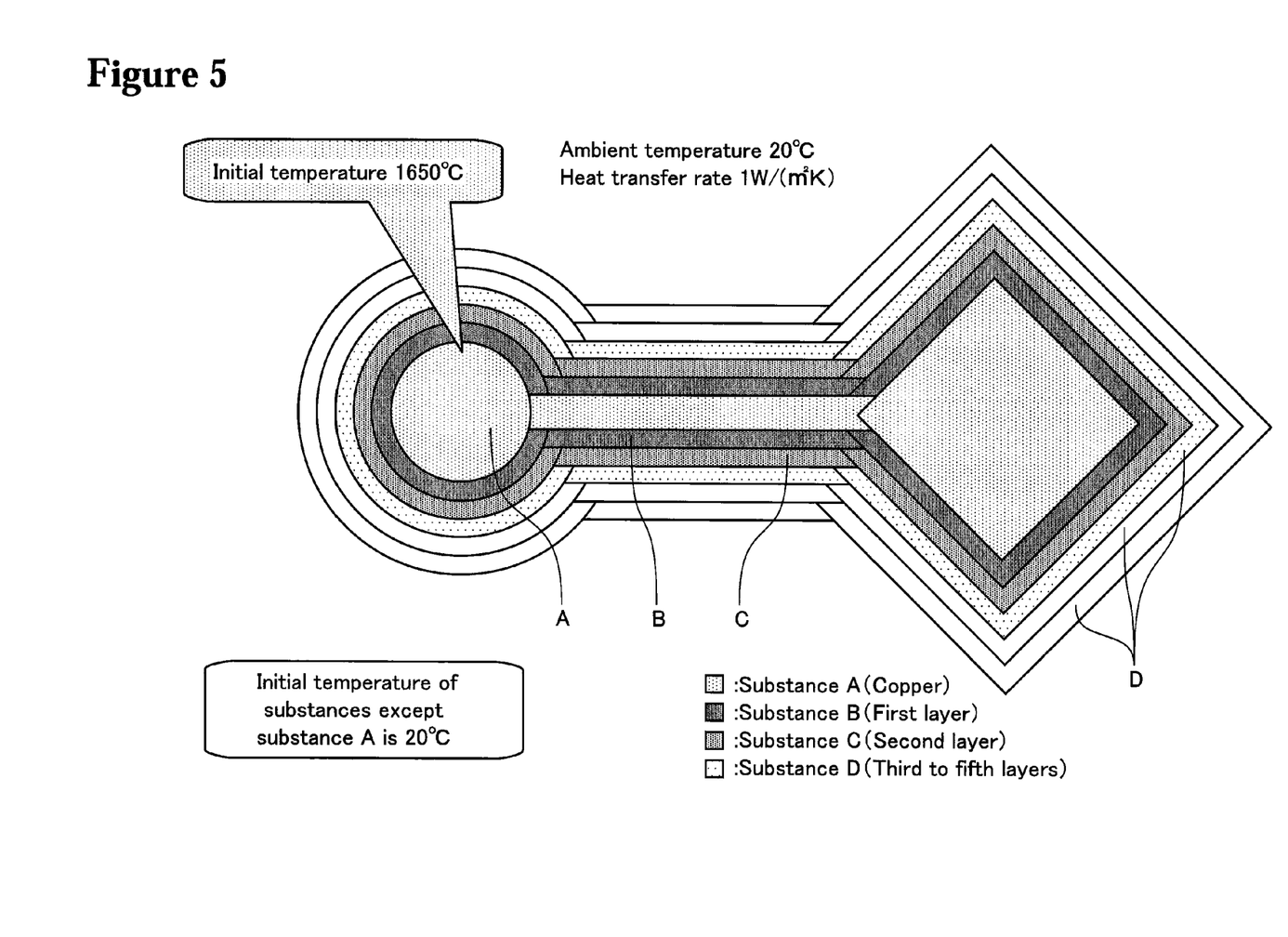
FIG. 5 is a view illustrating the shape of a mold used in simulation.

FIG. 5 shows a two-dimensional sectional view of a mold (model) for simulating heat conduction, that is, diffusion of the temperature of molten metal through the mold. The dimensions of the shape are: the inner diameter of a circular portion is 30 mm and the side of a square portion is 40 mm. The thickness of the bar connecting the circular portion and the square portion is 4 mm.

As is shown in FIG. 5, steel (substance A) was used as molten metal, the aforementioned coating composition was used as the first layer (substance B) of the mold. As the second layer (substance C), the aforementioned collapsible material (alumina cement: 400 g, regular cement: 100 g, ash balloon: 50 g, vermiculite: 24 g) was used. As the third to fifth layers, regular cement used in Example 1 was used. As the peripheral conditions of the mold, the temperature of the mold was set at 20° C. and the surface of the mold was covered with an insulating material having a thermal conductivity of 1 W/(m²·K). The temperature of the center portion of the molten metal in the beginning was set at 1650° C.

Figure 6:
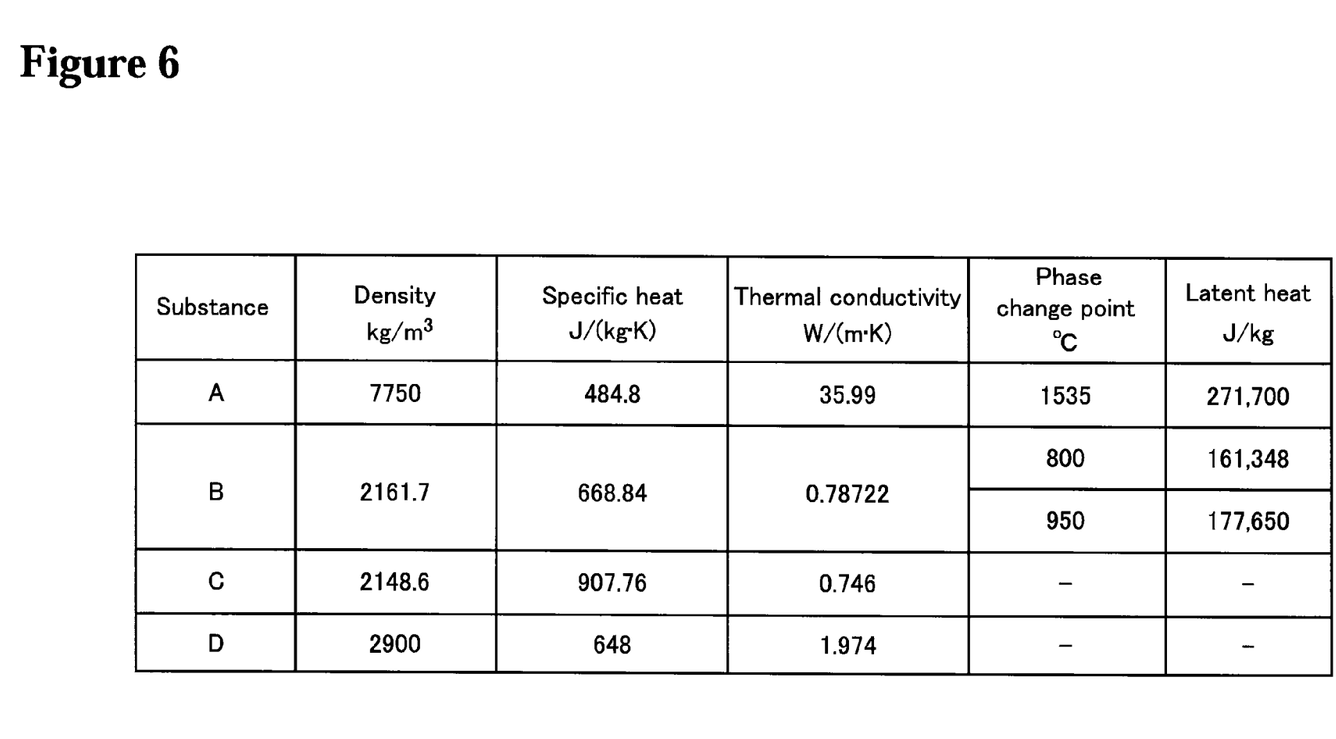
FIG. 6 is the table showing physical properties used in simulation.

FIG. 6 is a table showing physical properties used in simulation.

As the specific heat values and heat conductivity values of the substances contained in individual layers, the values disclosed publicly were used. Since the values of unexpanded vermiculite were not found, the values of the raw ore obtained were measured in the JAPAN FINE CERAMICS CENTER and put in use. The specific heat thereof was 0.96 kJ/(kg·k) and the thermal conductivity thereof was 0.27 W/(m·k).

In the lost-wax mold, wax is melted and removed. Therefore, the temperature of the mold is once increased to about 150° C. It is regarded that hydrates are all evaporated during this step and that an endothermic reaction will not occur due to the evaporation heat of water when molten metal is poured. Under such conditions, simulation is performed.

Figure 7:
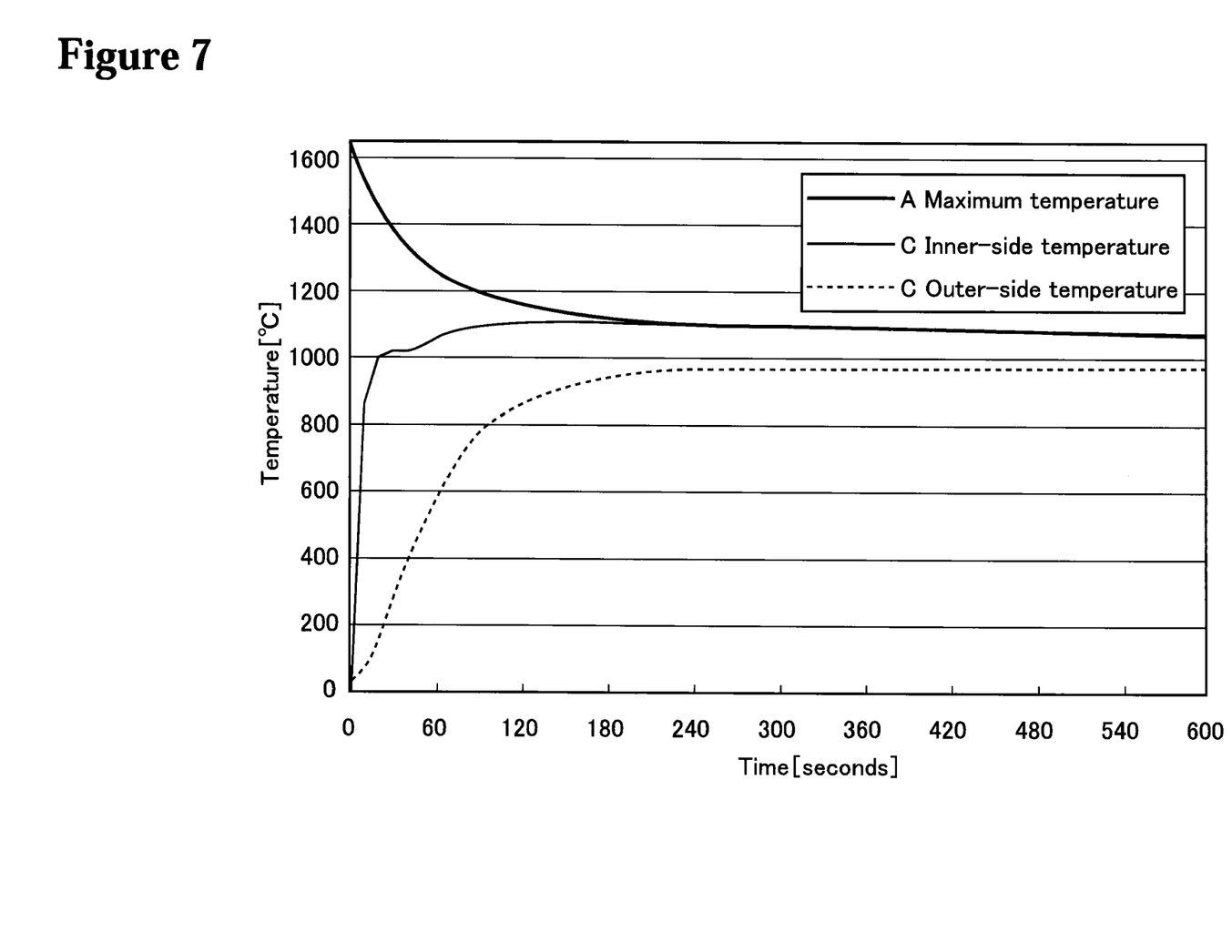
FIG. 7 is a graph showing the temperature change of the second layer of a mold in simulation.

FIG. 7 is a graph showing the simulation results, more specifically, a change of temperature with time after molten metal is poured. In FIG. 7, the curve of the center portion is represented by A (described as A: maximum temperature); the boundary between the first layer and the second layer is represented by C (described as C: inner-side temperature); and the boundary between the second layer and the third layer is represented by C (described as C: outer side temperature). Time required for all positions of the second layer (Substance B) to reach 800° C. is 1 minute and 35 seconds after initiation of pouring the molten metal. An actual collapse time is estimated based on collapse experiment data (Table 9, in the case of maintaining at 800° C.) of test pieces TP formed of the collapsible material.

TABLE 9

| Shape dimension | 40 × 10 × 250 mm | 40 × 20 × 250 mm | 40 × 30 × 250 mm | 40 × 40 × 250 mm |
|---|---|---|---|---|
| Collapse time | 4 minutes 40 seconds | 11 minutes 15 seconds | 17 minutes 20 seconds | 24 minutes 05 seconds |

The collapse time of a test piece TP having a section of 40×10 mm is 4 minutes and 40 seconds, which is equal to the collapse time of a layer having a thickness of 5 mm at 800° C. if heat is applied only to one side of a mold. Since the thickness of the layer actually used in the simulation test is 2.5 mm, collapse comes to occur 2 minutes and 20 seconds after the temperature reaches 800° C. Therefore, the actual collapse time of the mold is estimated to be 2 minutes 28 seconds, which is a sum of 2 minutes and 20 seconds mentioned above and 8 seconds (simulation time for the temperature of the second layer to increase to 800° C.) Since the surface temperature of the first layer is set at 1650° C., which is twice as large as the experimental temperature of a test piece TP, the collapse time of the simulation is one minute and 35 seconds later. This differs from the aforementioned time.

Parameters were set in various ways in the simulation and the following facts are found.

(1) In the first layer (substance B), owing to dolomite added to alumina cement, an effect of reducing the surface temperature due to thermolysis can be obtained; at the same time, collapsibility after cool is improved. This means that the temperature of molten metal is reduced by increasing the thickness of the layer without changing the composition, and thereby, time for the second layer (substance C) to reach 800° C. can be delayed.

(2) The second layer (substance C) reaches 800° C. without fail, which is a temperature at which unexpanded vermiculite expands.

(3) The third layer (substance D) has a large effect upon reducing the time for all positions of the second layer (substance C) to completely reach 800° C. by the initial temperature.

Figure 8:
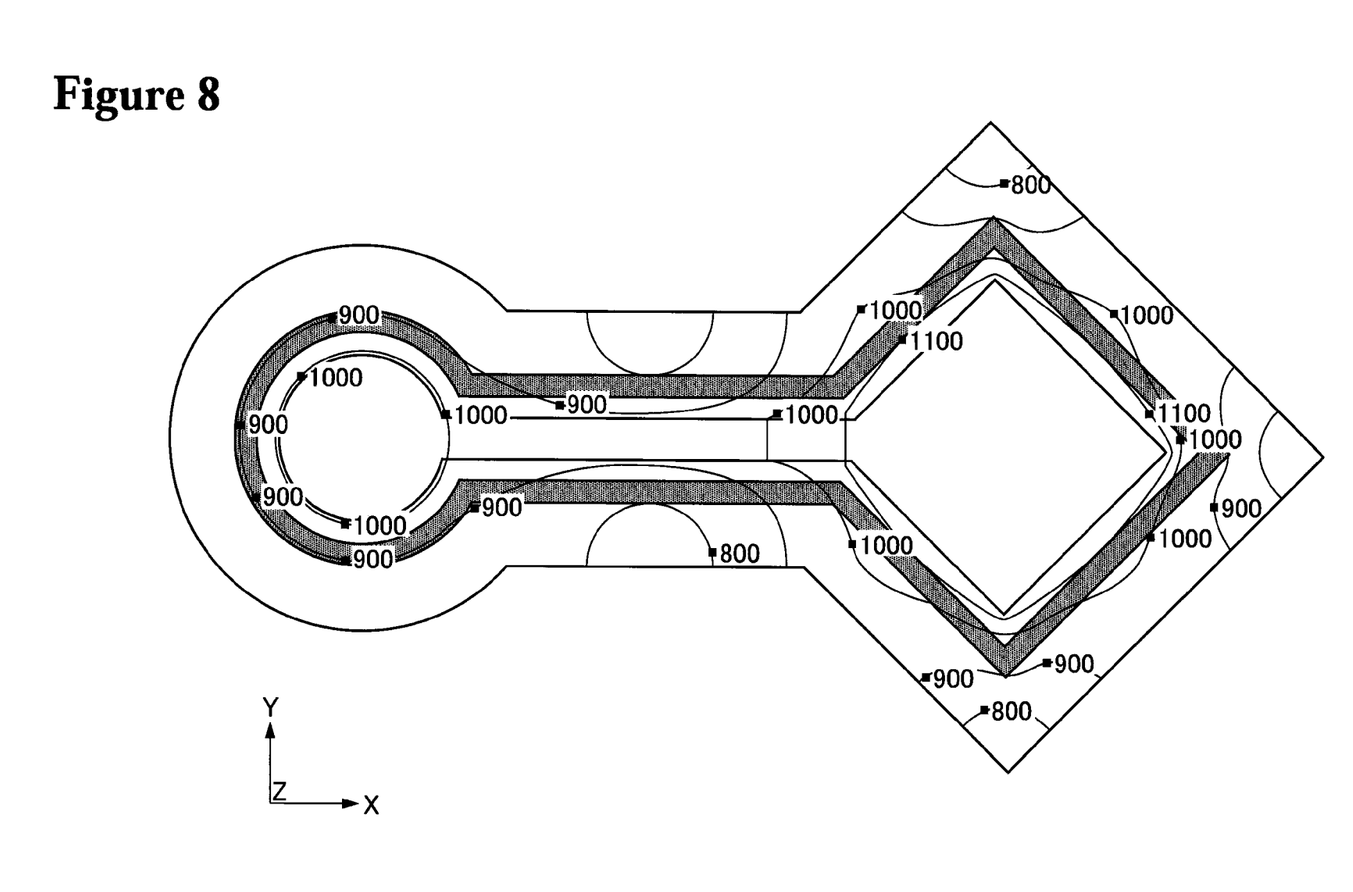
FIG. 8 is a temperature distribution of the second layer at one minute and 35 seconds after initiation of pouring molten metal.

(4) FIG. 8 shows temperature distribution of the second layer one minute and 35 seconds after initiation of pouring molten metal. The temperature reducing rate differs between the coat layer of the circular portion and the coat layer of the square portion. The first layer of the circular portion reduces to 1000° C.; whereas, the first layer of the square potion is 1100° C. The difference in area of the circular portion and the square portion is equal to the difference between heat capacity of molten metal (steel). As a result, the reduction of temperature of the square portion delays. This means that the temperature of molten melt (steel) when the second layer collapses can be controlled by changing the thickness and composition of the first layer depending upon difference in shape. Note that numerical values such as "900" in FIG. 8 indicate temperature values (° C.).

As is described above, the time for the second layer (substance C) to reach 800° C. can be easily controlled by controlling a melting temperature and solidifying temperature depending upon a specific composition of a cast based on the information obtained in a simulation. Therefore, the present invention can be applied to various shapes of molds.

The invention claimed is:

1. A collapsible material comprising
a base formed of a hydrate of a hydraulic material and unexpanded vermiculite particles dispersed in the base, wherein a coating film comprising alumina cement and at least one of silica powder and dolomite is formed on the surface of the base,
wherein the base is collapsed by use of thermal expansion of the unexpanded vermiculite particles.

2. The collapsible material according to claim 1, wherein the hydraulic material is formed of at least one of cement and gypsum.

3. The collapsible material according to claim 1 or 2, wherein the unexpanded vermiculite particles are contained in an amount of 0.5 to 15 wt %.

4. The collapsible material according to claim 1, further comprising ash balloon particles in an amount of 0.5 to 20 wt %.

5. A placement rack for placing an object to be incinerated thereon, wherein the placement rack is formed of a collapsible material comprising a base formed of a hydrate of a hydraulic material and unexpanded vermiculite particles dispersed in the base, wherein a coating film comprising alumina cement and at least one of silica powder and dolomite is formed on the surface of the base,
wherein the base is collapsed by use of thermal expansion of the unexpanded vermiculite particles.

6. A method of incinerating an object to be incinerated, comprising placing the object to be incinerated on a placement rack and providing a space under the placement rack on which the object to be incinerated is placed, wherein the placement rack is formed of a collapsible material comprising a base formed of a hydrate of a hydraulic material and unexpanded vermiculite particles dispersed in the base, wherein a coating film comprising alumina cement and at least one of silica powder and dolomite is formed on the surface of the base,
wherein the base is collapsed by use of thermal expansion of the unexpanded vermiculite particles.

7. A lost-wax mold for placing an object to be casted thereon, wherein the lost-wax mold contains a collapsible material comprising a base formed of a hydrate of a hydraulic material and unexpanded vermiculite particles dispersed in the base, wherein a coating film comprising alumina cement and at least one of silica powder and dolomite is formed on the surface of the base,
wherein the base is collapsed by use of thermal expansion of the unexpanded vermiculite particles.

8. A method of collapsing a mold comprising collapsing a lost-wax mold formed of a collapsible material by use of thermal expansion of unexpanded vermiculite, wherein the collapsible material comprises a base formed of a hydrate of a hydraulic material and the unexpanded vermiculite particles dispersed in the base, wherein a coating film formed of at least one of a hydrate of the hydraulic material, silica powder and dolomite is formed on the surface of the base.

9. The method according to claim 8, wherein the hydraulic material is formed of at least one of cement and gypsum.

10. The method according to claim 8 or 9, wherein the unexpanded vermiculite particles are contained in the collapsible material in an amount of 0.5 to 15 wt %.

11. The method according to claim 8, wherein the collapsible material further comprises ash balloon particles in an amount of 0.5 to 20 wt %.

* * * * *